Dec. 30, 1969   J. H. LEMELSON   3,486,640
MULTI-SPEED CONTROL SYSTEM FOR A LOAD CARRIER IN A
WAREHOUSE SYSTEM
Filed April 7, 1965                                3 Sheets-Sheet 1

INVENTOR
JEROME H. LEMELSON
BY Meyer, Baldwin, Doran & Egan
ATTORNEYS

Dec. 30, 1969   J. H. LEMELSON   3,486,640
MULTI-SPEED CONTROL SYSTEM FOR A LOAD CARRIER IN A
WAREHOUSE SYSTEM

Filed April 7, 1965   3 Sheets-Sheet 2

INVENTOR
JEROME H. LEMELSON
BY
Meyer, Baldwin, Doran & Egan
ATTORNEYS

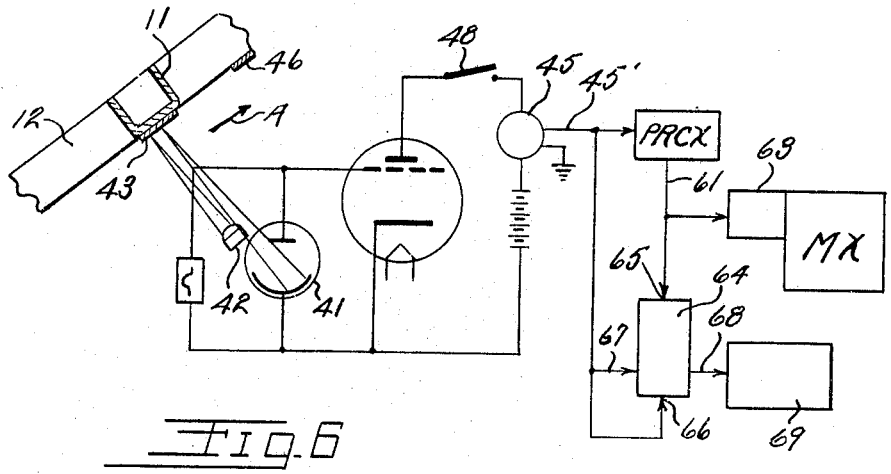

United States Patent Office 3,486,640
Patented Dec. 30, 1969

3,486,640
MULTI-SPEED CONTROL SYSTEM FOR A LOAD CARRIER IN A WAREHOUSE SYSTEM
Jerome H. Lemelson, Metuchen, N.J., assignor to The Triax Company, Cleveland, Ohio, a corporation of Ohio
Continuation-in-part of application Ser. No. 152,702, Oct. 17, 1961. This application Apr. 7, 1965, Ser. No. 446,326
The portion of the term of the patent subsequent to Jan. 28, 1981, has been disclaimed
Int. Cl. B65g 37/00, 43/08
U.S. Cl. 214—16.4                    3 Claims

ABSTRACT OF THE DISCLOSURE

An automatic warehousing system comprising a multibin storage frame having vertically extending storage bays, and a load carrier movable alongside said storage frame and adapted to insert and withdraw loads from a selected bin of a selected bay in the storage frame. The load carrier comprises a generally horizontally movable carriage with mast structure depending from the carriage, and with an elevator mounted for vertical movement on the mast structure, and with a load handling means mounted on the elevator for lateral movement with respect thereto for movement into a selected bin in either a high or low position for respectively depositing or withdrawing loads therefrom. Motive power means is provided for moving the load carrier and a control system coacts therewith for controlling the actuation of the motive power means. The control system includes command devices actuated by electrical inpulses received from position locating devices mounted on the load carrier and movable with the load carrier, for controlling the motive power means, and control devices are in circuit with said command devices to determine whether the load carrier will pick up a load at a selected storage bin or will deposit a load thereat, thereby causing the desired pick up or delivery sequence of motions of the load carrier. The position locating devices may take the form of switch means mechanically actuated by the movement of the load carrier, or in another embodiment, photoelectric cell means which are actuated by light reflectors mounted on the storage frame in connection with the stopping of the load carrier at the selected storage bin. The actuator means for the aforesaid switch means or photoelectric cell means comprises spaced members operative to first cause slowing down of the load carrier or causing it to coast, and then to cause stopping of the load carrier precisely at the selected storage bin, thus increasing the accuracy of positioning of the load carrier with respect to the selected storage bay or bin.

Control for automatic warehouse

This invention relates to improvements in automatic warehousing apparatus and is a continuation-in-part of my copending application, Ser. No. 152,702 (now abandoned) entitled Automatic Production Systems, filed Oct. 17, 1961 (said application being a division of the application Automatic Warehousing Systems, Ser. No. 449,874, now abandoned filed July 28, 1954 and replaced by continuation application 145,013 filed Oct. 10, 1961 and issued Jan. 28, 1964 as U.S. Patent 3,119,501), and Ser. No. 219,357 entitled Automatic Storage Apparatus, filed Aug. 13, 1962 and now abandoned.

In my copending application Ser. No. 152,702, an automatic warehousing apparatus is disclosed comprising a socalled stacker crane which is movable along a track, such as an overhead monorail, and is programmed in its operation to either store an article or palletized load, disposed on its material handling load support means or forks, or to retrieve from storage a preselected article or load. The stacker crane is movable vertically and horizontally past open shelves or bins in a storage frame, and is programmed to carry out sequences of movements which deposit or retrieve a load at a selected bin and transfer the load between the bin and another station.

An object of the present invention is to provide, in warehousing apparatus of the type set forth above, an improved means for controlling the positioning of a load at a selected bin.

Another object is to provide means for stopping the motion of a load transfer means in either a vertical or a horizontal direction.

Still another object is to provide means for stopping the transfer means at a precise location by a control element which is responsive to a first means for slowing or braking the transfer means and a second means for precisely stopping said transfer means.

Yet another object is to provide the above apparatus wherein the first and second means are fixed relative to the storage frame and are aligned in spaced relation along the direction of travel of the transfer means.

Other objects of the invention and the invention itself will be readily understood from the following description of four embodiments thereof as shown in the accompanying drawings.

FIG. 1 of the drawings shows a perspective view of a portion of a storage frame or rack with a load carrier means positioned alongside thereof.

FIG. 6 is a schematic view similar to FIG. 4 showing a more detailed electrical diagram in connection with the third embodiment of the invention.

Figure 1:
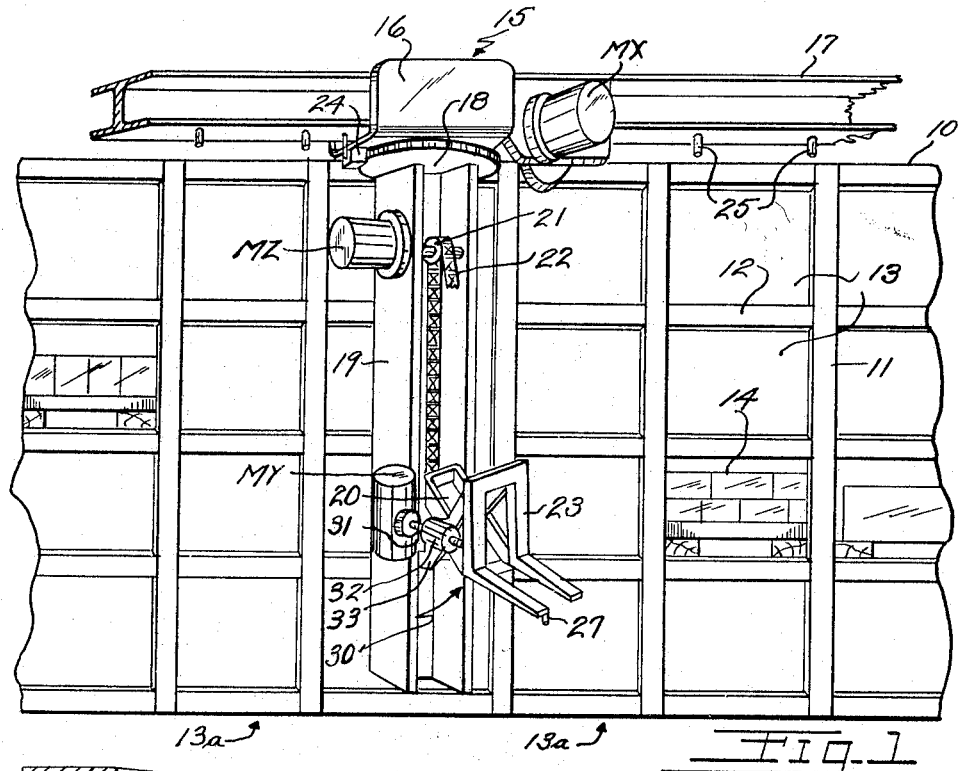

Referring now to FIG. 1 of the drawings an exemplary warehousing system for use with the control means of this invention comprises a storage frame 10 of skeletal form made up of vertical and horizontal members 11 and 12 respectively which define a multiplicity of vertically and horizontally aligned, open faced storage bins 13. The bins 13 are arranged in vertical bays 13a along an aisle which may have a mirror image storage frame disposed on the other side thereof.

Means for transferring a palletized load, such as that shown at 14, from any desired location to a selected bin or from a selected bin to any desired location is provided in the form of a carrier 15. The carrier 15 comprises a carriage 16 mounted for rolling engagement along the overhead track 17. The track 17 is disposed above and parallel with the aisle whereby the carriage 16 moves horizontally adjacent to the upper edge of the storage frame 10. The carriage 16 is power driven along the overhead track 17 by a motor MX and associated driving means.

The carriage 16 carries a turntable 18 adjacent to its bottom surface which said turntable, in turn, supports a vertical column or mast structure 19. The column 19 extends downwardly with its lower end spaced only a slight distance above the floor or base surface upon which the entire warehousing system is built. An elevator 20 is mounted for travel up and down the column 19 which said column may be U-shaped in horizontal section to accommodate said elevator therein. A motor MZ carried by the column 19 elevates and lowers the elevator 20 by any suitable means such as a gear 21 and associated chain 22.

The elevator 20 carries a horizontally movable load handling means, here shown in the form of a pair of lift forks 23, said lift forks being horizontally movable toward and away from the column 19 by any suitable mechanism, such as that shown at 30. Said mechanism comprises a reversible motor MY which rotates a worm 31, said worm engaging a threaded collar 32. The collar 32 is connected to a scissor-blade, parallel linkage 33 secured to the elevator 20 at one end and the lift forks 23 at the other. It will be readily understood that the lift forks 23 can be caused to move toward or away from the elevator 20 by rotation of the worm 31 in one direction or the other.

The lift forks 23 can be rotated to either side of the aisle by the turntable 18 whereby they can be used to insert or draw a load in one of the bins 13 or to pick up or deposit a load on a conveyor or the like (not herein illustrated) on the opposite side of the aisle. The turntable 18 may be either motor driven or manually turned by grasping the lower end of the column 19.

It is preferred that the general warehousing system or arrangement described above (and which may be generally similar to that shown in aforementioned patent application 449,874 and in aforementioned U.S. Patent 3,119,501) be controlled by automatic control means such as those set forth in my above referred-to applications. In general, it is anticipated that the carriage 15 will be adapted to start from a beginning or pickup station at one end of the asile and move horizontally along the overhead track 17, at the same time automatically counting the bays by means of a horizontal counter switch 24 adapted to be sequentially tripped by trips 25 of said overhead track. Similarly, it is anticipated that the elevator 20 is adapted to carry a vertical counter switch 26 (FIG. 2) which may, for example, count the vertical row of bins in each bay by a switch arm 27 thereof contacting the horizontal members 12 of the storage frame 10.

It will be understood that each of the motors MX, MZ and MY may be provided with a cooperating brake which is self-energized upon de-energization of the associated motor whereby coasting of any of the movable elements described in the carrier is substantially eliminated. However, other more precise means for stopping motions of the carrier are hereinafter described.

The basic operation of the exemplary warehousing system shown comprises the movement of the carrier 15 along the aisle from a beginning or start position with the lift forks 23 turned toward the storage frame on one side of the aisle. If the carrier is going to pick up a load, the lift forks 23 will be initially empty. As the carriage 16 moves along the track 17, the vertical bays are counted by the switch 24, and means are provided for stopping the carriage at a selected bay, and as disclosed in the aforementioned U.S. patent application Ser. No. 449,874. Simultaneously therewith or subsequently thereto, the elevator 20 moves vertically to a selected bin level and is stopped at a selected bin by means associated with the vertical counterswitch 26. Thereafter, the motor MY moves the lift forks 23 into the bin under the load 14, the motor MZ moves the lift forks upwardly sufficiently to lift said load free of the bin supporting surface, and said motor MY moves said lift forks back into the aisle with the load thereon whereby it can be subsequently transferred either back to the start position, to a different unloading position, or to another storage bin. Depositing a load, which is initially on the lift forks 23 at the start position of the carrier 15, is effected by a reverse motion of said lift forks whereby they are moved inwardly of the bin by the motor MY with the load disposed slightly above the load carrying surface of the bin, lowered, and then retracted into the aisle thereby leaving the load at the selected bin.

Figure 2:
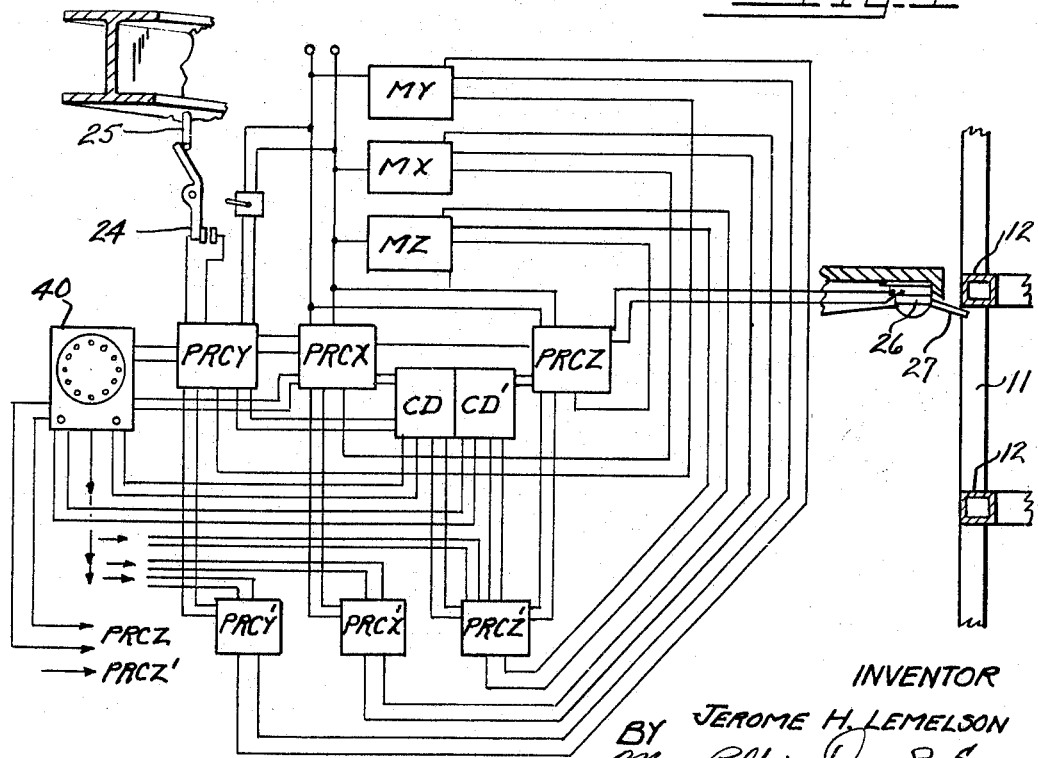
FIG. 2 is a schematic view showing control means for an automatic warehouse according to a first embodiment of the invention.

FIG. 2 shows a schematic control system for controlling the carrier, elevator, and lift forks in the above described sequence of movements for depositing or picking up loads at the storage frame 10. The rectangles designated PRCY, PRCX, and PRCZ, represent predetermining command devices for controlling the motors MY, MX and MZ respectively. Said predetermining command devices may comprise counters, each one adapted to open and close one or more switches for controlling its associated motor. They may comprise mechanical counting mechanisms or electrical counting switches which are usually arranged in banks to be actuated by electrical impulses received by one or more position locating devices. The predetermined control devices PRCY, PRCX, and PRCZ may be used to control their associated motors for causing a first half of the cycle wherein the carriage 16 and the elevator 20 move the lift forks 23 to a preselected bin with the command device PRCY causing the lift forks to move into said selected bin. A similar, corresponding bank of command devices designated PRCY', PRCX' and PRCZ' may be used to cause the reverse of these actions for moving the lift forks 23 out of the bin and returning them empty or loaded to a start position.

For manually setting of the command devices PRCY, PRCY', PRCX, PRCX', and PRCZ and PRCZ' it is preferable to use a dial operated switching device as shown at 40 in FIG. 2, said device being similar to the dial switch utilized in the conventional telephone. Such device may be used to cause a series of pulses of current, depending on the number dialed, to actuate a solenoid or close relays in a bank as in a telephone control circuit. Each signal operated by the dial device 40 may be used to open one of said relays, and the opening of a preset group of said relays may cause opening of a switch in circuit with a particular motor control. Predeterming electrical counting and control devices are known to the art and may be of various designs. For this reason, in the schematic showing of FIG. 2, said control devices are shown merely as boxes which are electrically connected to each other for the purpose of starting each to operate in sequence.

At CD and CD' I show special control devices for determining whether the lift forks 23 will pick up a load at a selected storage bin or whether they will deposit a load thereat. The command device CD is used to control the automatic action of the lift forks 23 when travelling empty from the aisle opposite a selected bay whereby they will move into said bay, move upwardly to pick up a load, and thereafter return with the load to the aisle. The command device CD', on the other hand, controls the automatic action of said lift forks when they are initially carrying a load at the aisle position and causes them to move into the selected bin, lower the load onto the bin support surface, and return empty to the aisle position.

It is anticipated that either the command device CD or CD' may be thrown into circuit at the dial device 40 whereby one of them is locked in with the vertical and horizontal counters PRCZ and PRCX, respectively, to cause the desired pickup or delivery sequence of motions of the lift forks 23. Said command devices CD and CD' may be any mechanical or electrical devices which will open and close circuits to the motors MZ and MY after a specific number of rotations of said motors and in a sequence which will drive the forks in either of the two desired sequences of movements. The switches 24 and 26 feed back signals to the command devices PRCX and PRCY thereby causing said command devices to uncount as the apparatus is moved toward the locations predetermined by use of the dial device 40. The return or reverse command devices indicated by the primed letters may be actuated by the same or similar switches and may be set up either by the dial device 40 or by the counting out of the command devices PRCY, PRCX and PRCZ. The above arrangement is disclosed in the aforementioned U.S. patent application 449,874.

In FIG. 2, the switch 26, which is located on the end of one of the lift forks 23, is used to count the number of storage bays 13a as the elevator 20 travels vertically, by closing a circuit with the counter PRCZ every time the switch arm 27 strikes a horizontal member 12 or shelf. If the switch 26 is a universal switch which is normally opened and closed every time the forks 23 pass a bin 13 and the switch arm 27 strikes either a member 11 or 12, then the switch 26 may be used par se to locate the preset of desired storage unit volume or bin. In this arrangement, the switch 26 would be connected to the predetermining counters through PRCY permitting the aforedescribed station-seeking action. The horizontal counter switch 24 may be eliminated if the forks 23 are made to always travel opposite the racking so that the switch arm 27 will be deflected with either vertical or horizontal movement of said forks and as disclosed in aforementioned application 449,874. If the monorail system is utilized, this is a matter of positioning the trackway so that the forks, when retracted, will just clear the storage frame 10.

Figure 3:
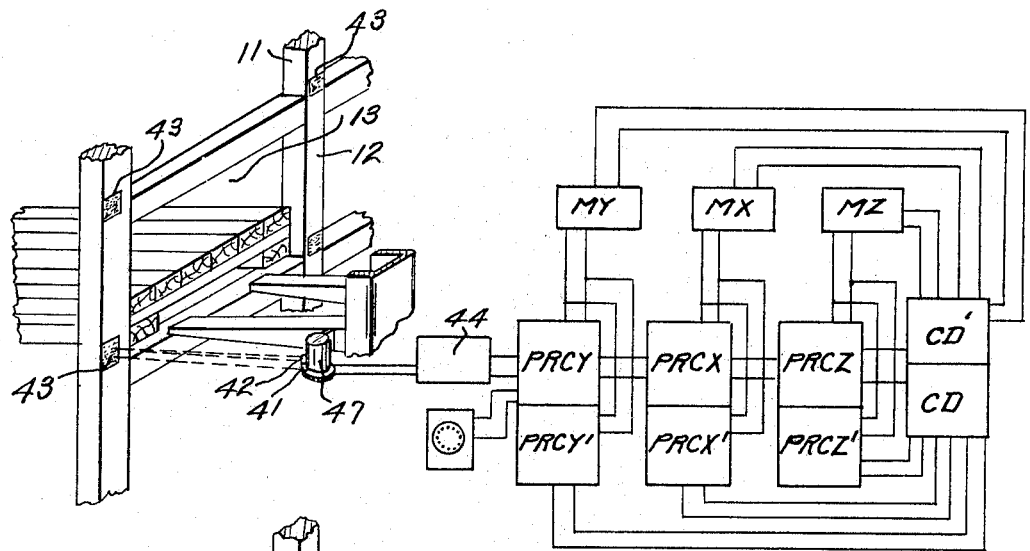
FIG. 3 is a schematic view of the control means according to a second embodiment of the invention.
Figure 3A:
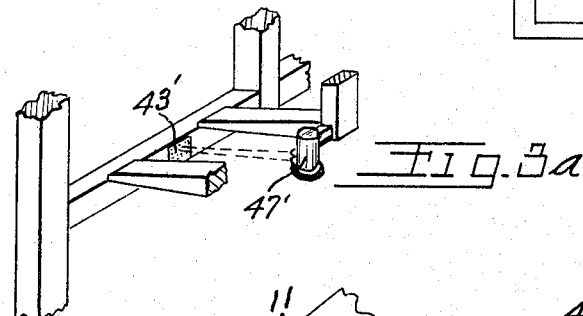
FIG. 3a shows a slight modification to FIG. 3.

FIG. 3 is a partial diagrammatic view of a predetermining counting system as disclosed in aforementioned U.S. application 449,874, and utilizing a photoelectric cell 41 and a light source 42 to detect station or bay locations. A small reflector 43 is positioned at the same relative attitude respective to each bay on either a vertical member 11 or a horizontal member 12 facing the aisle so that the beam from the light source 42 may be reflected thereby back to the photoelectric cell 41 and close a relay operated switch in a photoelectric control 44 signaling the predetermining counters which have been preset by the dial device 40. The photoelectric cell 41 and the light source 42 may be mounted in a single casing 47 to the outside of one of the forks 23 (FIG. 3), or between said lift forks as shown at 47' (FIG. 3a), so that the light beam may project against a reflector 43 or 43', respectively, on the face of the storage frame 10.

Figure 4:
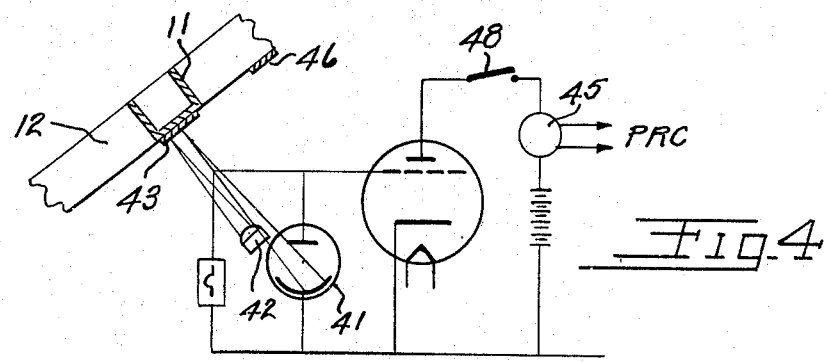
FIG. 4 is a schematic view of a portion of the control means according to a third embodiment of the invention.

FIG. 4 is a diagram of a photoelectric control circuit, similar to that disclosed in aforementioned U.S. patent application 449,874, which amplifies the signal in the photo tube reflected out of the reflector 43 from the light source 42. A relay 45, connected through a start switch 48 which would be closed to start the warehousing apparatus, is actuated by said signal and is electrically connected to the means actuating the predetermining counters. The numeral 46 refers to a second reflector positioned adjacent to the reflector 43. Said second reflector 46 is utilized to effect more precise stopping of any moving part of this invention which is controlled by the photoelectric cell 41 and the light source 42 as follows. A reflection of the beam of the light source 42 from the reflector 43 (or 43') through the relay 45 sends a pulse or opens a current circuit to a device such as a solenoid which either slows or brakes the motor MX (or whatever motor is driving the unit past the reflector 43) a sufficient degree to be precisely stopped at a desired position upon the passing of the second reflector 46.

Figure 5:
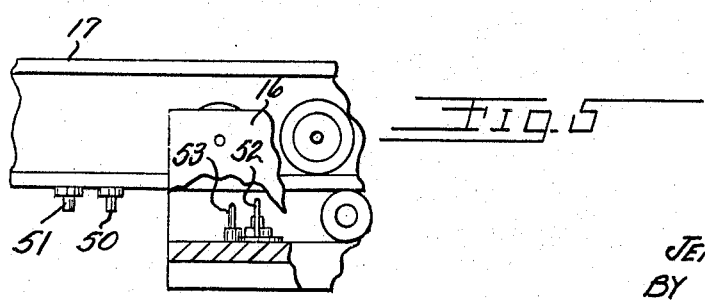
FIG. 5 is a fragmentary view showing an alternate means for stopping the load carrier means according to a fourth embodiment of the invention.

The arrangement of FIG. 5 shows another means for stopping the carriage 16, said means comprising two pins 50 and 51 depending from the overhead track 17 and spaced apart from each other in the direction of said track. A pair of switches 52 and 53 are carried by the carriage 16. The throwing of the first switch 52 by the pin 50 will turn off or slow down the motor MX. The throwing of the second switch 53 by the pin 51 may be coupled to a brake stopping the motor MX and the carriage 16 at a precise position.

It will be readily appreciated that the pin 50 is positioned in the path of the actuator arm of the switch 52 and the pin 51 is similarly positioned in the path of the actuator arm of the switch 53 and that said paths are laterally offset from each other.

FIG. 6 shows one way of utilizing the amplified signal generated when light from the light source 42 is reflected by the reflector 43 to the photoelectric cell 41. The relay 45, connected through the start switch 48, is actuated by the amplified signal and is electrically connected to the means actuating the predetermining counter PRCX. The second reflector 46 is utilized to effect more precise stopping of the carriage 16 in the following manner. A reflection of the beam of the light source 42 from the reflector 43 at the selected bay causes the photoelectric scanning circuit to energize the relay 45, an output 45' of which is pulsed and activates the predetermining counter PRCX causing it to fully uncount. A control output 61 of the counter PRCX is connected to a de-energizing or stop control 63 of the motor MX, the activation of which control occurs when the counter PRCX uncounts and generates a pulse on said output 61. The carriage 16 which is driven by the motor MX then coasts or decelerates in the direction of the arrow A until the light beam intersects the second reflector 46 which said second reflector again energizes the photoelectric cell 41 and the relay 45. The output 45' is also connected through a control device 64 to a braking servo 69 which said servo may be a solenoid actuated electro-mechanical brake operative when activated to stop rotation of the shaft of the rotor MX or the mechanism driven thereby to precisely position the forks with respect to the selected bay.

The control device 64 may comprise a bi-stable electro-mechanical or electronic flip-flop switch having a first switching input 65 operative to condition or close the switch to complete a circuit between its signal input 67 and an output 68. The input 67 is connected to the output 45' of the relay 45, and the output 68 is connected to the energizing input of the braking solenoid 69. Thus when the output 61 of the counter PRCX is energized upon the uncounting of said counter, the drive motor MX is de-activated and the switch 64 is conditioned to pass the next pulse generated on the output 45' (when the scanner scans the reflector 46) to the braking solenoid 69 thereby effecting precise stoppage of the forks.

Numeral 66 refers to the resetting input of the bi-stable switch 64 which said input is connected to the output 45' of the relay 45. Thus, until the counter PRCX uncounts and conditions the switch 64 to pass the next pulse generated by the relay 45, said switch 64 will block passage of signals generated on the input 67 from reaching the braking solenoid 69. The counter PRCX will, of course, necessarily be set to count or be uncounted by all reflective markers 43 and 46 which are in the scanning path up to and including the last marker 43 before the precise positioning by the last marker 46 of the selected storage bay.

It is noted that the photoelectric scanning means of FIG. 6 may be replaced by electro-mechanical scanning means such as that provided in FIGS. 1, 2 and 5 whereby projecting pins or dogs mounted on the storage rack frame members or overhead track are correspondingly located to perform similar functions as the reflective markers 43 and 46.

What is claimed is:

1. In an automatic warehousing system, a storage frame defining a plurality of storage bins disposed in different bays and at different levels in each bay; with said storage bins having open load receiving ends disposed in a plane; load carrier means including a carriage movable generally horizontally past said storage frame to different bays and generally vertically extending mast structure supported by said carriage with an elevator mounted for vertical movement on said mast structure; and cantilever type generally horizontally movable load handling means mounted on said elevator for movement into and out of said bins at different levels; and to a position as determined by the position of said elevator, slightly lower or slightly higher than a selected level to pick up or deposit a load respectively; said load carrier means being movable generally horizontally parallel with and adjacent to said plane for moving a load into or from a selected storage bin; a plurality of power means for moving said carriage, said elevator, and said load handling means; control means for activating said power means to cause said carriage, said elevator and said load handling means to execute a sequence of movements from a beginning position to a selected bin in a selected bay and at a selected level for depositing or picking up a load; said control means including control element means mounted to move parallel with said plane with the movement of said load carrier means; actuating means associated with the selected storage bin actuating said control element means as said load carrier means approaches said selected storage bin; said actuating means being operative to so actuate said control means whereby the latter will first reduce the speed of movement of said load carrier means and then will precisely stop said load carrier means at said selected storage bin, with said control element means deactivating certain of said power means when said control element means is actuated at said selected storage bin; said actuating means comprising a first actuator and a second actuator; said control means being responsive to said first actuator to reduce the speed of movement of said carrier means, and being responsive to said second actuator to precisely stop said carrier means at said selected storage bin.

2. An automatic warehousing system in accordance with claim 1, wherein said load carrier means is adapted to be moved from a beginning position to a position in aligned relation with a selected bay and said actuating means is associated with said selected bay, said actuating means actuating said control element means as said carriage of said load carrier means approaches said selected bay, the actuation of said control element means deactivating said power means of said carriage at said selected bay for precisely stopping said horizontal movement of said carriage at said selected bay to thus be disposed in alignment with said selected bay.

3. In an automatic warehousing system, a storage frame defining a plurality of storage bins disposed in different bays and at different levels in each bay; with said storage bins having open load receiving ends disposed in a plane, load carrier means including a carriage movable generally horizontally past said storage frame to different bays and generally vertically extending mast structure supported by said carriage with an elevator mounted for vertical movement on said mast structure; and cantilever type generally horizontally movable load handling means mounted on said elevator for movement into and out said bins at different levels, and to a position as determined by the position of said elevator, slightly lower or slightly higher than a selected level to pick up or deposit a load respectively; said load carrier means being movable generally horizontally parallel with and adjacent to said plane for moving a load into or from a selected storage bin; a plurality of power means for moving said carriage, said elevator, and said load handling means; control means for activating said power means to cause said carriage, said elevator and said load handling means to execute a sequence of movements from a beginning position to a selected bin in a selected bay and at a selected level for depositing or picking up a load; said control means including control element means mounted to move parallel with the movement of said load carrier means, actuating means associated with the selected storage bin actuating said control element means as said load carrier means approaches said selected storage bin, said actuating means being operative to so actuate said control means whereby the latter will first reduce the speed of movement of said load carrier means and then will precisely stop said load carrier means at said selected storage bin, with said control element means deactivating certain of said power means when said control element means is actuated at said selected storage bin; and wherein said control element means includes means for generating an energy field in the vicinity of said load carrier means and a scanning means for scanning said actuating means, said actuating means being fixed with respect to said storage frame and at least one of said actuating means being adapted to be supported in said energy field for abruptly changing the level of the energy field in the vicinity of said actuating means with there being at least two of said actuating means for each storage bay; said scanning means being responsive to changes in the level of said energy field for generating output signals, and arranged to scan said actuating means as said load carrier means moves; said control means including predetermining command relay means in circuit with certain of said power means; and said command means serving to stop said certain power means upon receipt of predetermined position indicating signals generated by said scanning means as said load carrier moves along said storage frame.

References Cited

UNITED STATES PATENTS

| | | | |
|---|---|---|---|
| 1,844,514 | 2/1932 | Mattingly | 187—29.24 |
| 1,871,164 | 8/1932 | Dunlop | 187—29.24 |
| 2,000,703 | 5/1935 | Keipef | 187—29.24 |
| 2,691,448 | 10/1954 | Lontz. | |
| 3,119,501 | 1/1964 | Lemelson | 214—16.4 |
| 3,132,753 | 5/1964 | Chasar et al. | 214—16.4 |

GERALD M. FORLENZA, Primary Examiner

R. B. JOHNSON, Assistant Examiner

U.S. Cl. X.R.

187—29